United States Patent [19]
Boneberger et al.

[11] Patent Number: 5,894,002
[45] Date of Patent: Apr. 13, 1999

[54] PROCESS AND APPARATUS FOR THE MANUFACTURE OF A CONTACT LENS

[75] Inventors: Karlheinz Boneberger, Erlenbach; Lothar Haase, Morsbach/Sieg; Horst Schäfer, Aschaffenburg; Werner Steffan, Eichenbühl; Peter Zang, Grossostheim, all of Germany

[73] Assignee: CIBA Vision Corporation, Duluth, Ga.

[21] Appl. No.: 08/824,592

[22] Filed: Mar. 26, 1997

Related U.S. Application Data

[63] Continuation-in-part of application No. 08/353,602, Dec. 12, 1994, abandoned.

[30] Foreign Application Priority Data

Dec. 13, 1993 [EP] European Pat. Off. .............. 93810872

[51] Int. Cl.⁶ ..................................................... B29D 11/00
[52] U.S. Cl. .................. 264/1.36; 264/1.38; 264/2.6; 425/174.4; 425/174.8 E; 425/808
[58] Field of Search .................. 425/174.8 E, 174.8 R, 425/808, 174.4; 264/1.36, 1.7, 2.3, 2.6, 132, 2.7, 1.38

[56] References Cited

U.S. PATENT DOCUMENTS

| | | |
|---|---|---|
| 3,478,387 | 11/1969 | Ruekberg . |
| 3,660,547 | 5/1972 | Ruekberg . |
| 4,257,755 | 3/1981 | Lemelson . |
| 4,955,580 | 9/1990 | Seden ........................................ 249/82 |
| 5,158,718 | 10/1992 | Thakrar . |
| 5,294,379 | 3/1994 | Ross et al. ............................. 264/2.3 |
| 5,326,505 | 7/1994 | Adams et al. .......................... 264/2.7 |

FOREIGN PATENT DOCUMENTS

| | | |
|---|---|---|
| 5242493 | 6/1994 | Australia . |
| 472303 | 2/1992 | European Pat. Off. . |
| 1497746 | 10/1966 | France . |
| 1 052 290 | 12/1953 | Germany . |

OTHER PUBLICATIONS

Bloss, Fritz, "Zur Koronabehandlung von Formteilen" Vorbehandeln.

Softal Report, Mechanismender Korona–Entladung.

Kunststoffober flächen, Aktivieren von, "Koronaentladung ist eine umwelt freundliche Vorbehandlung," TR Hett 31, 1993.

*Primary Examiner*—Mathieu D. Vargot
*Attorney, Agent, or Firm*—Michael U. Lee; R. Scott Meece

[57] ABSTRACT

In a process for the manufacture of contact lenses, a polymerizable contact lens material is dispensed into a mould half (1) and the mould is subsequently closed by means of the second mould half (2). The material located between the two mould halves in the moulding cavity (12) is then polymerized, thus forming an as yet unhydrated contact lens (CL). The moulding surface of one of the two mould halves (1, 2) is pre-treated, before use, in a region (20) outside the optically active zone of the contact lens (CL) in such a manner that, when the mould is opened, the contact lens (CL) adheres to the pre-treated mould half.

10 Claims, 8 Drawing Sheets

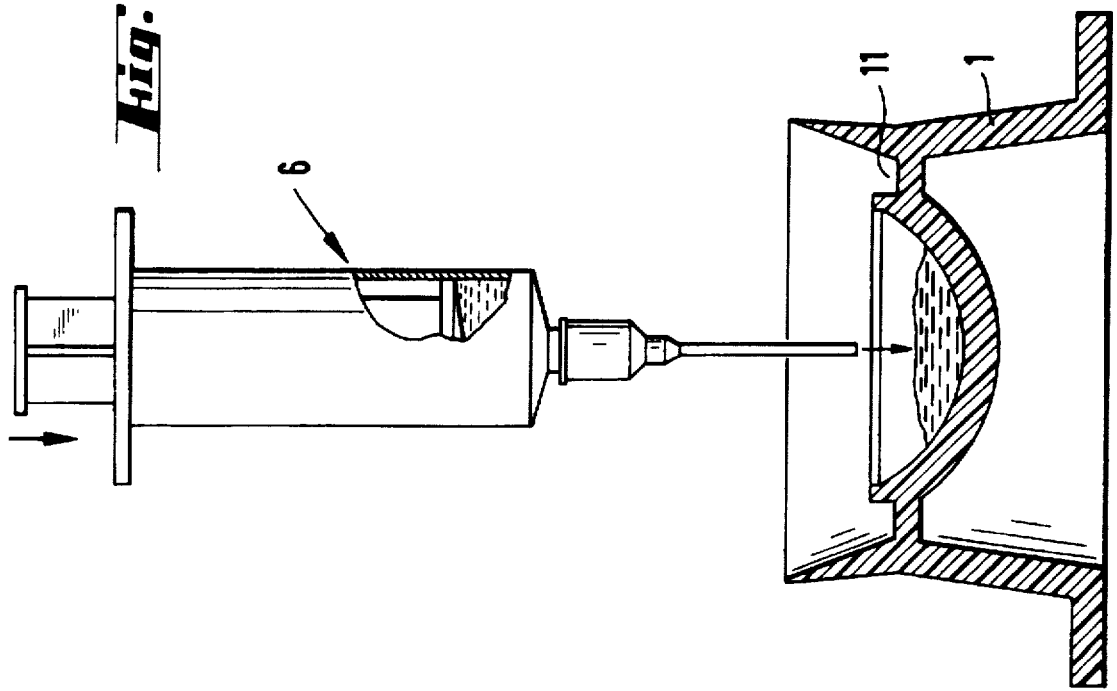

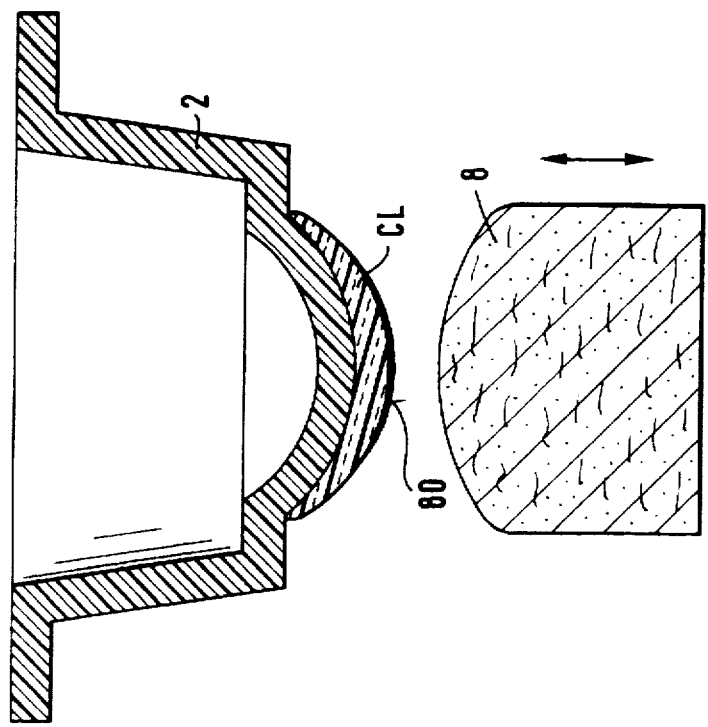
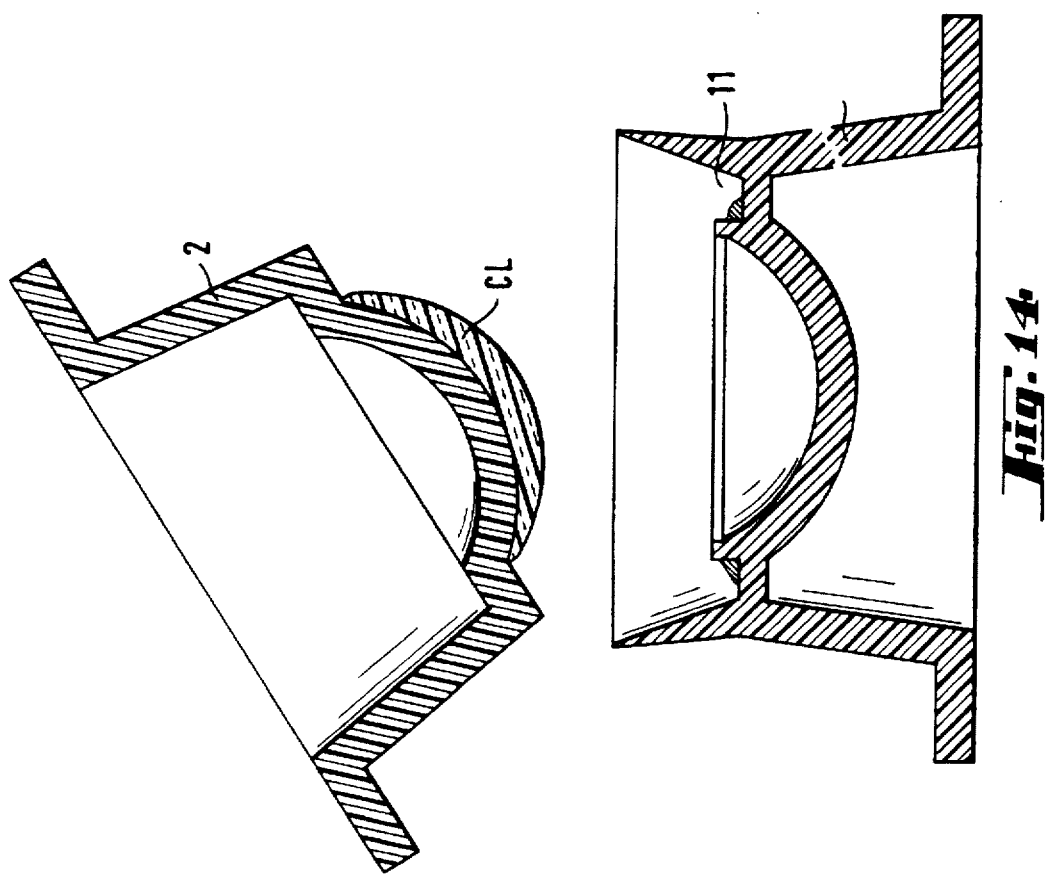

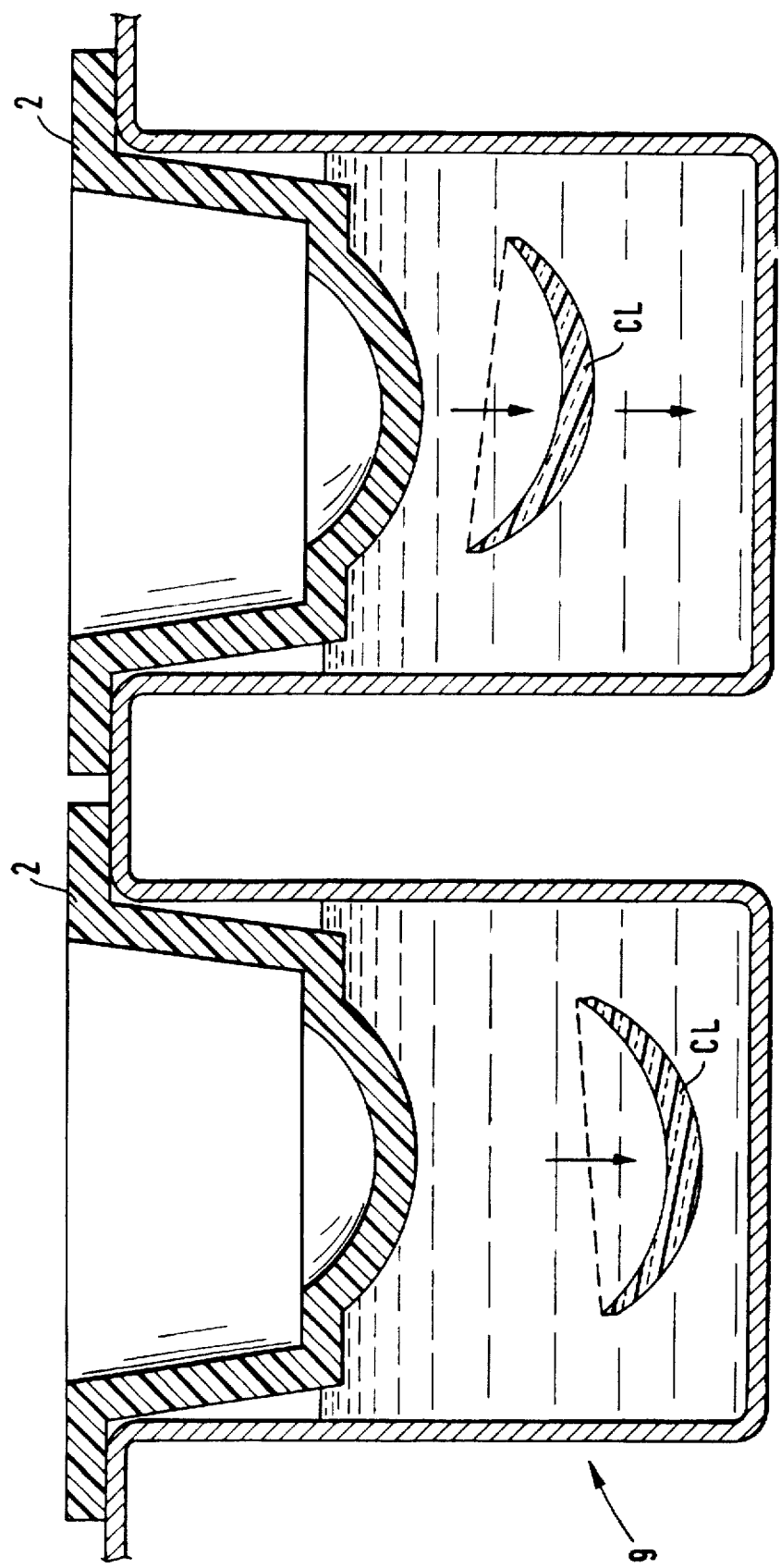

PROCESS AND APPARATUS FOR THE MANUFACTURE OF A CONTACT LENS

This application is a continuation-in-part of application Ser. No. 08/353,602, filed on Dec. 12, 1994, now abandoned.

BACKGROUND OF THE INVENTION

1. Field of the Invention

The invention relates to a process and an apparatus for manufacturing a contact lens.

2. Description of the Related Art

In the manufacture of contact lenses by the so-called full-mould process (casting process), contact lenses are usually produced by dispensing a specific amount of a polymerisable contact lens material into the female mould half. The mould is then closed by putting on the male mould half, a moulding cavity being enclosed between the two moulding surfaces. In that moulding cavity there is the previously dispensed contact lens material, which is polymerised to form an as yet unhydrated contact lens. Subsequently, the mould is opened and the polymerised but as yet unhydrated contact lens is removed and further processed.

Unfortunately, it is not possible as a rule to predict reliably to which of the two mould halves the contact lens will adhere: in some cases it adheres to the male mould half (mould half with the convex moulding surface) and, in others, it stays in the female mould half (mould half with the concave moulding surface). Neither case occurs with sufficient frequency, however, to enable an essentially fully automatic process to be tailored to one of those two cases.

The reasons for this lie inter alia in the manufacture of the mould halves. Such mould halves are usually manufactured by the injection-moulding process. The problems encountered with that process will be briefly explained using the manufacture of the female mould half 1 as an example. In injection-moulding, mould inserts of the kind shown in FIG. 1 are usually used. Such mould inserts F1 belong to the state of the art. The example shown here has the shape of a mushroom. They are produced, for example, by means of the turning technique. When turning the head K of the mushroom, first the surface K1 is turned (FIG. 2), then the surface K2 (FIG. 3). In so doing—because of turning with a turning diamond D—a burr G1 or G2 (FIG. 2, FIG. 3) is produced in each case, which has to be removed when the turning process has been completed. Removal of the burr G1 or G2 is carried out, for example, with a cotton wool bud W (FIG. 4). As a result, at the place where the burr has been removed a rounded area R is produced which deviates from the ideal, burr-free corner, said deviation from the ideal shape being in the range of a few micrometers (FIG. 5). If that mould insert F1 is then inserted and the female mould half 1 is moulded around that mould insert, a projection 10 (FIG. 6), albeit a very small projection, is produced in that area. Depending upon its size, however, when the mould halves are opened that projection may have the result that the lens remains in the female mould half because it catches on the projection, or the lens may slide over the projection so that it is found in the male mould half. It is almost impossible to say which, certainly not with the reliability necessary for an automated process. After opening of the mould, therefore, a check must be made in every case to discover on or in which mould half the polymerised but as yet unhydrated contact lens is located.

SUMMARY OF THE INVENTION

It is therefore desirable and accordingly is an object of the present invention to provide a process and a corresponding apparatus with which the previously required check to discover on or in which mould half the contact lens is located after the mould has been opened can be omitted and the process can nevertheless proceed automatically since it can reliably be assumed that the contact lens will adhere to one of the two mould halves. One condition to be made here is that the optically active region of the contact lens is not affected by such measures since, otherwise, the optical correction effect of the contact lens may be altered or the contact lens may even become totally unusable.

With regard to the process, this object is achieved by pre-treating the moulding surface of one of the two mould halves, before use, in a region outside the optically active zone of the contact lens in such a manner that, when the mould is opened, the contact lens adheres to the pre-treated mould half. That mould half together with the contact lens can then be used automatically for the further processing of the contact lens and, consequently, a check to discover on or in which mould half the lens is located can be omitted. This enables the process to be further simplified, since the mould half to which the contact lens adheres can be further processed directly together with the contact lens adhering to it. Since the contact lens furthermore adheres to the pre-treated mould half only in a region outside its optically active region, the optical effect of the contact lens is fully retained in every case.

In a preferred variant of the process, the mould half is pre-treated in the region in question by corona-discharge. This pre-treatment is not complicated technically and ensures secure adhesion of the contact lens to the mould half in question.

Preferably, the male mould half is pre-treated since then the further processing of the contact lens proves to be especially simple. When the mould is opened, the contact lens adhering to the male mould half is able to slide reliably over the projection 10 (FIG. 6) of the female mould half described at the beginning, and the further treatment process can accordingly be tailored to the male mould half with the contact lens adhering to it.

In another variant of the process, the unhydrated contact lens adhering to the mould half is tempered in an additional process step while the mould is still closed, the mould is subsequently opened and then the mould half to which the as yet unhydrated contact lens is adhering is passed to a hydration station where the unhydrated contact lens is detached from the mould half and hydrated. By tempering the contact lens any stresses in the material can be relieved and the polymerisation can be finally completed. During hydration, the lens is detached from the mould half and swelled.

In the case where the contact lens adheres to the male mould half, in a further variant of the process the as yet unhydrated contact lens adhering to the male mould half is dyed in the iris region after opening of the mould. For dyeing the as yet unhydrated contact lens the tampon printing method is preferably used, which has already proved successful in the dyeing of contact lenses.

With regard to the apparatus, the problem of the invention is solved by providing a device for the pre-treatment that pre-treats the moulding surface of the one mould half in a region outside the optical zone of the contact lens in such a manner that, when the mould is opened, the contact lens adheres to the pre-treated mould half. That mould half together with the contact lens can then be used automatically for the further processing of the contact lens and, consequently, a check to discover on or in which mould half the lens is located can be omitted. This enables the apparatus to be simplified, since the mould half to which the contact lens adheres can be further processed directly together with the contact lens adhering to it, that is to say, the apparatus can be specifically tailored to the further processing of that mould half. Since the contact lens furthermore adheres to the pre-treated mould half only in a region outside its optical region, the optical effect of the contact lens is fully retained in every case. In a particularly preferred embodiment, corona treatment of the mold half occurs in an area from the edge of the optically active region to the edge of the contact lens. Thus, in this embodiment, no corona treatment is applied in the optically active region. Furthermore, no corona treatment is applied in an area from the edge of the lens to the edge of the mold half.

The are substantial advantages of treating only the lens area of the mold, and in particular, only that portion of the lens area which is outside the optically active area. First, the molded contact lens will adhere consistently to the mold half which is corona treated. Second, the optically active region is not damaged because this area is not corona treated. Third, the adhesion of flash (i.e., excess polymer or overflow outside the lens edge) to the mold half which retains the lens is minimized by not corona treating the mold in the area from the edge of the lens to the edge of the mold.

Therefore, this preferred embodiment of the present invention achieves the following advantages simultaneously:

encouraging consistent adhering of the contact lens to the treated mold half (i.e., by treating in the area from the optically active region to the lens edge)

inhibiting damage of the optically active region of the contact lens surface, which damage may occur by the corona treatment in the optically active region reducing the likelihood of flash adherence to the lens-retaining mold half (i.e., by not treating in the area from the lens edge to the mold edge)

Thus, a preferred embodiment of the invention is a process for the manufacture of contact lenses, in which a polymerizable contact lens material is dispensed into a mold half, the mold half is subsequently closed by means of the second mold half and then the material located between the mold halves in the molding cavity is polymerized, thereby forming a contact lens, which process includes: treating the molding surface of one mold half, before dispensing polymerizable contact lens material, in a region extending from the optically active zone to the edge of the contact lens, in such a manner that, when the mold is opened, the contact lens adheres to the pre-treated mold half.

In another embodiment of the invention, a first mold half is treated as described hereinabove, while a second mold half is corona treated in a region from the edge defining the edge of the contact lens to the edge of the mold. Treatment of this second mold half in this area causes flash to preferentially adhere to this second mold half, while treatment of the first mold half in the area defined hereinabove causes the contact lens to preferentially adhere to the first mold half. In a preferred embodiment, the first mold half is the female mold half, which has a concave molding surface, while the second mold half is the male mold half, which has a convex molding surface. Thus, one embodiment of the invention is a process for manufacturing contact lenses, which includes the steps of:

(a) corona treating a first mold half in a region from the edge which defines the optically active zone to the edge which defines the contact lens edge; and (b) corona treating a second mold half in a region from the edge which defines the contact lens edge to the edge of the second mold half.

In one advantageous example embodiment of the apparatus, there is provided for the pre-treatment of the one mould half a corona-treatment device comprising two electrodes which are arranged at a distance from each other and between which the mould half in question is arranged during the pre-treatment, the electrode facing the moulding surface of the mould half to be treated having an annular face which extends substantially over the region that is to be treated of the mould half. Thereby, the region outside the optically active region i.e., optical zone is pre-treated in such a manner that secure adhesion of the contact lens in the pre-treated region is ensured. On the other hand, the contact lens adheres to the pre-treated mould half only in a region outside its optically active region, as a result of which the optical effect of the contact lens is fully retained in every case. In addition, the construction costs for such an apparatus are low.

Preferably, the mould half to be treated is the male mould half and the annular face of the electrode facing the moulding surface is concave. This construction of the electrodes ensures uniform adhesion of the contact lens to the male mould half in the region outside the optically active region and the optical effect of the contact lens therefore remains unimpaired.

In another example embodiment of the apparatus, it has a tempering oven for the still closed mould with the unhydrated contact lens adhering to the one mould half, and a hydration device for detaching and hydrating the as yet unhydrated contact lens. By tempering the contact lens any stresses in the material are relieved and the polymerisation is finally completed. During hydration, the lens is detached from the mould half and swelled.

The apparatus may further comprise a device for dyeing which dyes the as yet unhydrated contact lens, adhering to the male mould half, in its iris region. It is thereby possible to manufacture contact lenses having a desired perceived colour of the iris. A device comprising a dyeing tampon which can be pressed onto the iris region of the contact lens in order to dye that region is especially suitable for that purpose.

BRIEF DESCRIPTION OF THE DRAWINGS

The prior art and the invention are described in detail below with reference to the drawings, some of which are schematic views and/or views in section and in which:

FIG. 9 to

FIG. 16 show a variant of the process according to the invention with the individual process steps.

DESCRIPTION OF THE PREFERRED EMBODIMENTS

FIGS. 1–6 serve merely for a better illustration of the problems encountered with the manufacture of contact lenses in the full-mould process and originating in the technique used for manufacturing the moulds. These problems have already been discussed at the beginning. During turning of the surfaces K1 and K2, a burr G1 and G2, respectively, is produced which is subsequently removed, for example, with a cotton wool bud W. This produces the rounded area R which, in the manufacture of the female mould half 1, results in the projection 10. As already explained at the beginning, when the mould is opened this can result in the contact lens either adhering to the male mould half or remaining in the female mould half owing to the projection 10; it is not possible to say sufficiently reliably.

Figure 1:
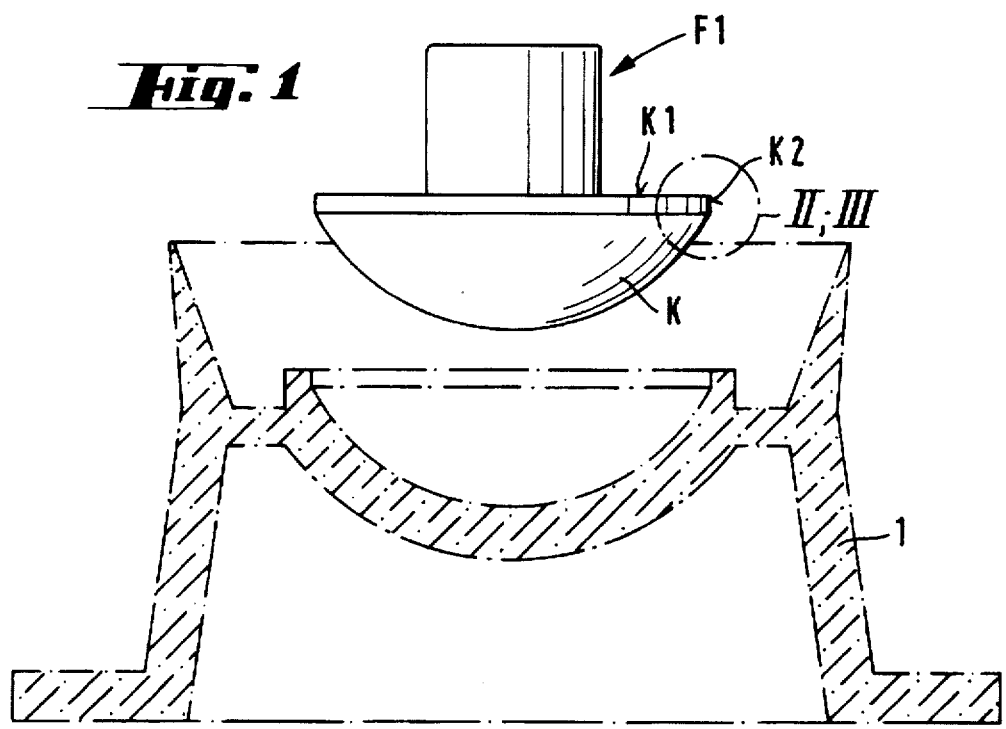
FIG. 1 shows a mould insert for an injection mould for the manufacture of the female mould half according to the state of the art.
Figure 2:
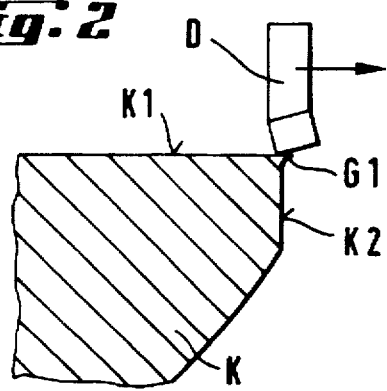
FIG. 2 shows the detail II of FIG. 1 to illustrate the production of one surface of the mould insert.
Figure 3:
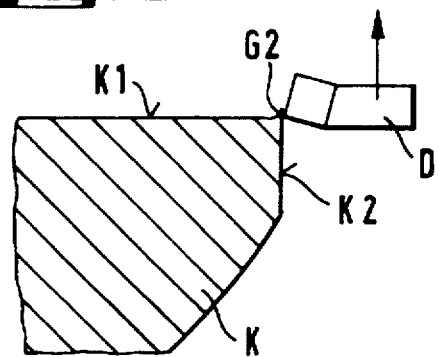
FIG. 3 shows the detail III of FIG. 1 to illustrate the production of a further surface of the mould insert.
Figure 4:
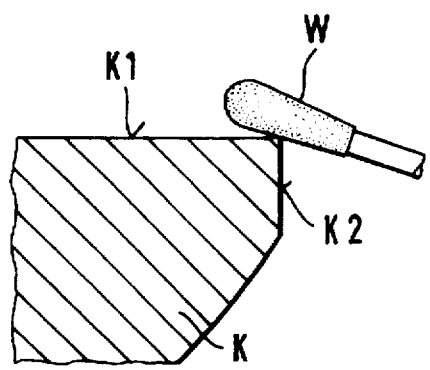
FIG. 4 shows the removal of the burr produced in the production of the mould insert.
Figure 5:
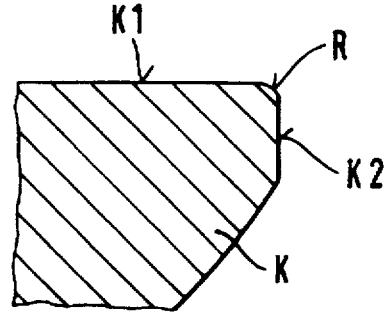
FIG. 5 shows the rounded area of the mould insert at the place where the burr has been removed.
Figure 6:
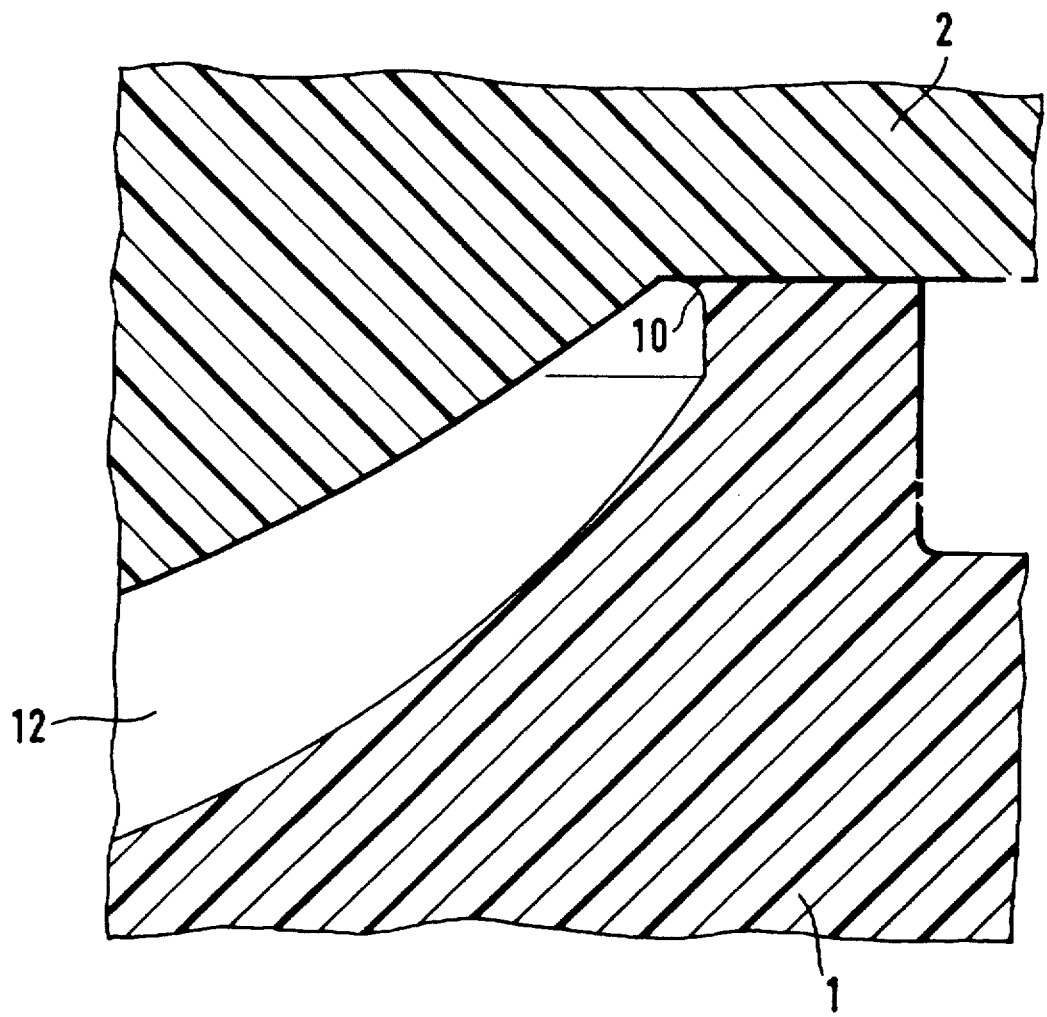
FIG. 6 shows a detail of the female mould half at the place where the mould insert has the rounded area.
Figure 7:
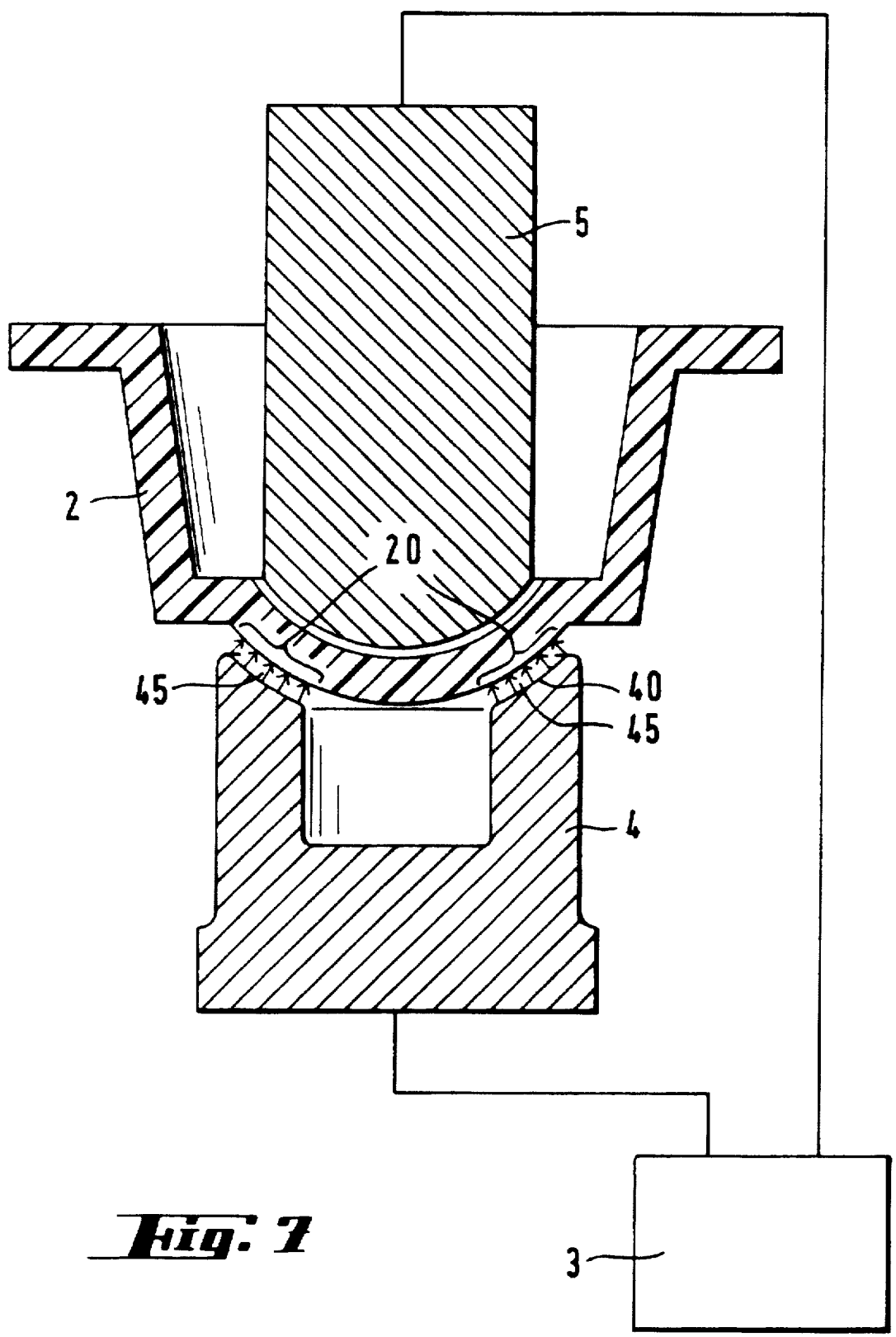
FIG. 7 shows a portion of an example embodiment of an apparatus according to the invention for the pre-treatment of the male mould half.

By means of the portion of an example embodiment of the apparatus according to the invention shown in FIG. 7 this problem is eliminated and, in addition, it is ensured that the optically active region of the contact lens remains unimpaired. In FIG. 7, a generator 3 will be seen which is connected to an electrode 4 and which supplies that electrode 4 with high voltage. Also seen is a counter-electrode 5 which is arranged at a distance from the electrode connected to the generator 3. Arranged in the space 45 between the electrodes 4 and 5 is the mould half to be treated, in this case a male mould half 2. The electrode 4 has an annular face 40 which extends substantially over the region 20 of the male mould half 2 to be treated and is concave. Located on the other side of the male mould half 2 is the convex counter-electrode 5.

In operation, the region 20 of the moulding surface of the male mould half 2 is bombarded with electrons or ions leaving the electrode 4 and impingeing on the region 20 of the male mould half 2 and changing the charge in that region. By that means there are produced on the surface of non-polar materials, such as, for example, on the moulding surface of polypropylene moulds, polar groups which ensure the adhesion of the subsequently formed contact lens to that surface. Suitable materials for the moulds are, for example, also polystyrene, PMMA (polymethyl methacrylate) or polycarbonate. Since only the region 20 that is not optically active is bombarded, the subsequently formed contact lens also adheres to the male mould half 2 only in that region 20.

For the pre-treatment of the male mould half 2 it is possible to use customary commercial corona-discharge devices, for example the device with the type name HS 020/600 produced by Arcotec. The bombardment time may be, for example, about one second, the frequency may be in the range of about 20 kHz to 40 kHz and the voltage between the electrodes may be approximately from 10 kV to 20 kV. These values are, however, to be regarded merely as examples and other parameters are also possible. The electrode 4, which is connected to the generator 3, advantageously consists of tungsten, at least on the annular face 40 facing the region 20 of the male mould half 2. This is advantageous in case the slightest deposit should occur on the contact lens later manufactured with that mould half. By selecting tungsten, reaction of the eye is then avoided.

Figure 8:
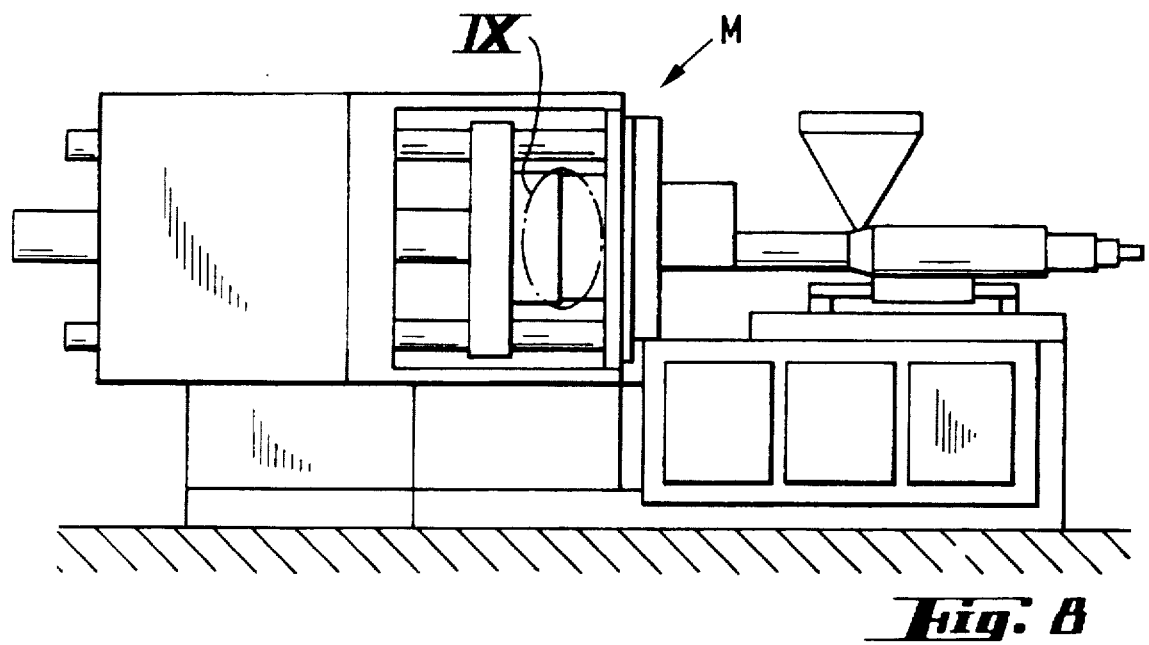
FIG. 8 shows an injection-moulding device for the manufacture of casting moulds which comprises an apparatus according to the invention.
Figure 9:
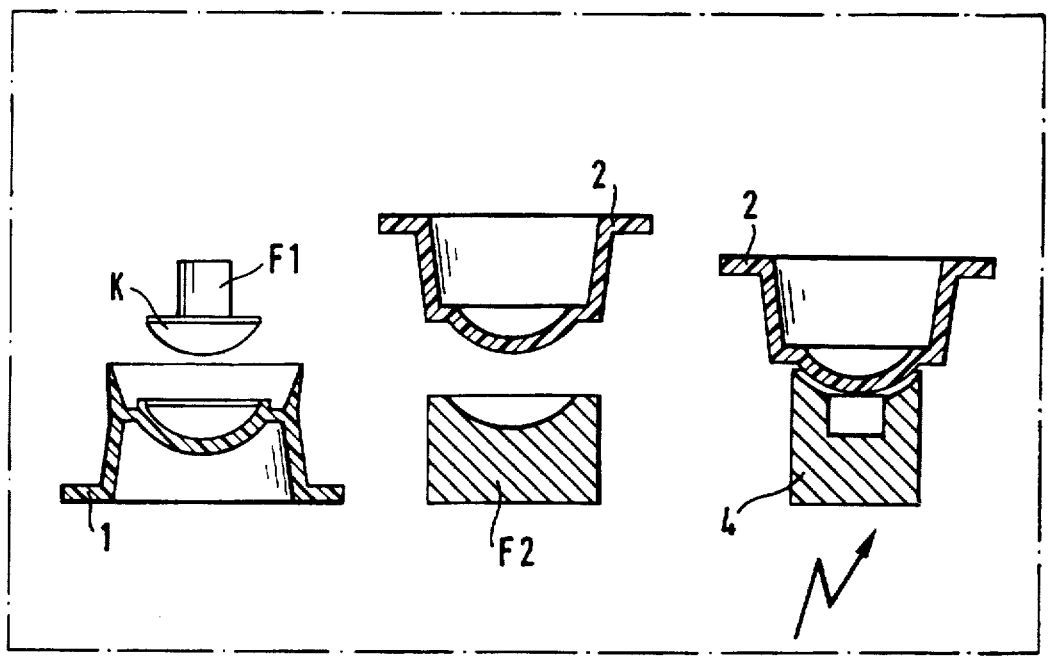

FIG. 8 shows an injection-moulding machine M with which the mould halves are made. The "core" of the machine is shown schematically in FIG. 9 since it illustrates the first process step in the manufacture of contact lenses. There, the two mould halves, the female mould half 1 and the male mould half 2, are manufactured with the aid of the corresponding mould inserts F1 and F2, respectively. The male mould half is subsequently subjected to corona treatment, with only the region 20 outside the optically active region of the contact lens subsequently manufactured by means of that mould half being pre-treated.

Subsequently, as shown in FIG. 10, a specific amount of a polymerisable material is dispensed into the female mould half 1 by means of a dispensing device 6 and then the male mould half 2 is put on and the mould is closed (FIG. 11). The moulding cavity 12 formed between the moulding surfaces of the two mould halves 1 and 2 defines the shape of the subsequently formed contact lens. As the mould closes, any excess unpolymerised contact lens material is pressed into an overflow 11 provided on the female mould half 1.

Figure 12:
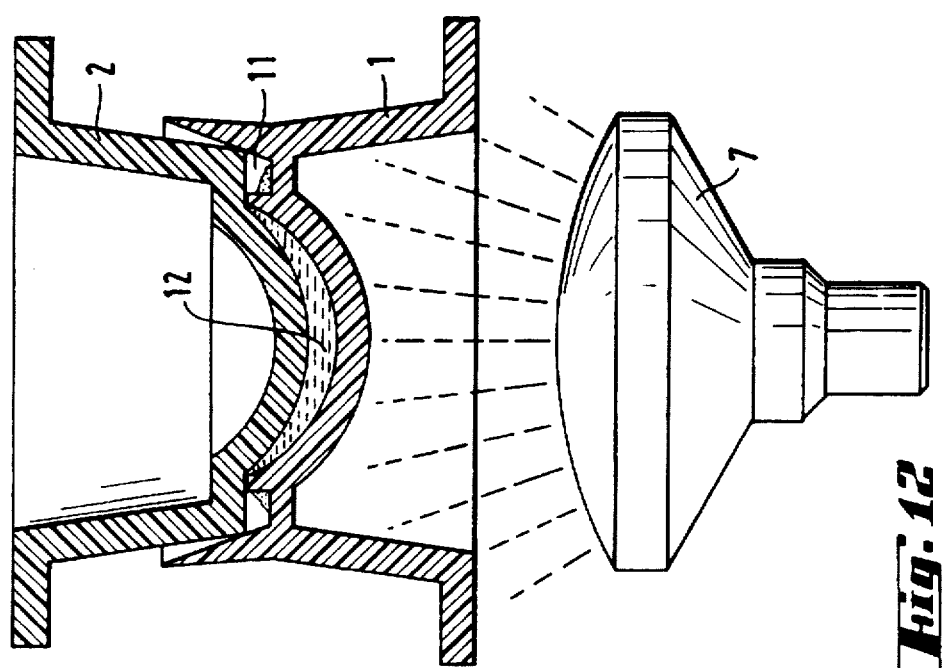

Subsequently, the closed mould together with the unpolymerised contact lens material enclosed in the mould is exposed to light from a light source 7, at least in the region of the moulding cavity 12 (FIG. 12). For that purpose, the female mould half 1 must, of course, consist of a material that is transparent to that light. Thus, at least the contact lens material present in the moulding cavity 12 is polymerised to form an as yet unhydrated contact lens CL. It is not necessary, however, for only the contact lens material in the moulding cavity 12 to be polymerised; it is also possible for any contact lens material present in the overflow 11 to be polymerised. This is advantageous in the respect that, when the mould is opened, the excess polymerised contact lens material then remains in the overflow 11 of the female mould half 1, while the contact lens CL adhering to the male mould half 2 can be removed and further processed together with male mould half 2.

Figure 13:
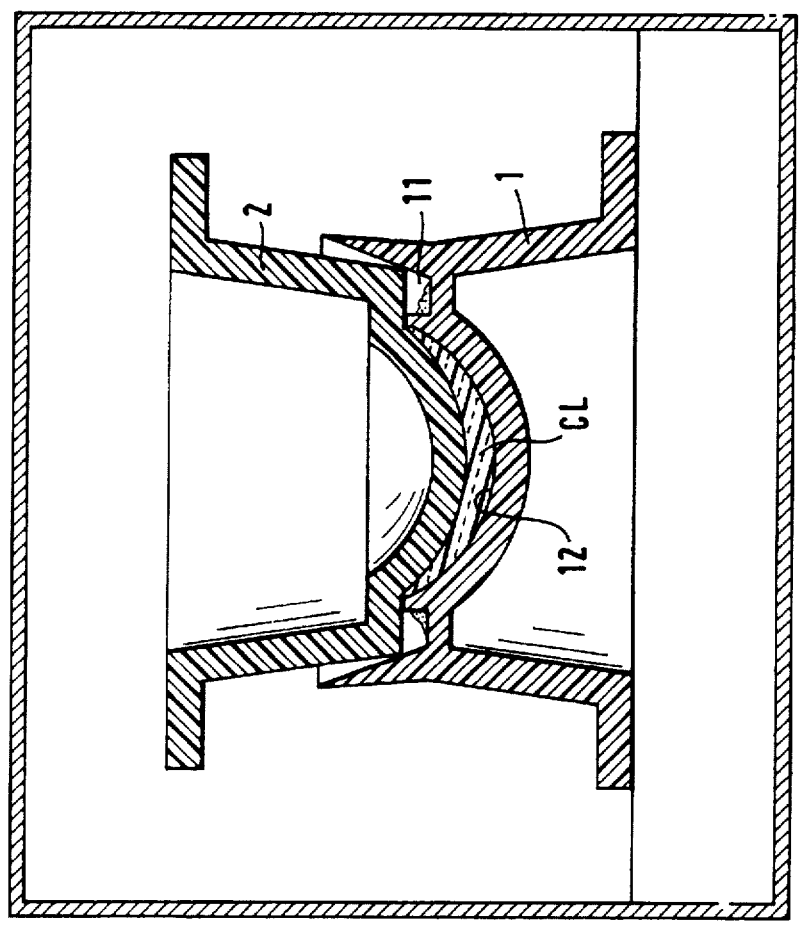

Before being opened, the mould together with the contact lens CL inside it is placed while still closed in a tempering oven for tempering and is tempered for a time at a temperature of approximately 120° C., whereby any stresses in the material are relieved and the polymerisation is finally completed (FIG. 13).

Subsequently, the mould is opened, the as yet unhydrated contact lens CL adhering to the male mould half 2, while excess contact lens material (shown in FIG. 14), on the other hand, remains in the overflow 11 of the female mould half 1.

The as yet unhydrated contact lens may then be dyed in the iris region of the lens, for example by means of a tampon 8 (FIG. 15) provided with a dye 80, to produce a desired perceived colour, but this is merely optional. The tampon 8 is for that purpose pressed onto the contact lens CL for a defined period of time.

The contact lens CL adhering to the male mould half 2 is then passed to a hydration device 9 where the contact lens CL is detached from the male mould half 2 and hydrated (FIG. 16). This hydration device 9 may be in the form of a magazine so that several contact lenses can be detached and hydrated at the same time. This also applies to the other devices described above.

It will readily be understood by one skilled in the art that, instead of the male mould half 2, the female mould half 1 can also be pre-treated, which has the result that the contact lens subsequently adheres to the female mould half 1, and the female mould half 1 with the contact lens located therein then has to be further processed.

What is claimed is:

1. A process for the manufacture of contact lenses, from a polymerizable contact lens material between two mould halves, comprising the steps of:
   a) pre-treating a moulding surface of one of said mould halves, wherein the pre-treating step comprises the steps of:
      1) positioning said mould half to be treated between two electrodes, wherein one of said electrodes facing said mould half has an annular face which effectively extends over a region that is to be treated and said region is outside the optical zone of the contact lens to be produced from the pre-treated mould half, and
      2) applying a corona discharge such that the pre-treating of said mould half occurs in said region to be treated;
   b) dispensing said polymerizable material into one of said mould halves;
   c) mating the mould half with the other mould half; and
   d) polymerizing said polymerizable material located between the mated two mould halves, thereby forming an as yet unhydrated contact lens,
   wherein the corona discharge pre-treating step is performed in such a manner that, when the mated mould is opened, the contact lens adheres to the pre-treated mould half.

2. A process according to claim 1, which comprises pre-treating the male mould half.

3. A process according to claim 1, wherein the unhydrated contact lens adhering to the mould half is tempered in an additional process step while the mould is still closed, the mould is subsequently opened and then the mould half to which the as yet unhydrated contact lens is adhering is passed to a hydration station where the unhydrated contact lens is detached from the mould half and hydrated.

4. A process according to claim 2, wherein the as yet unhydrated contact lens adhering to the male mould half is dyed in the iris region after opening of the mould.

5. A process according to claim 4, wherein a dyeing tampon method is used to dye the as yet unhydrated contact lens.

6. An apparatus for the manufacture of contact lenses, having a mould which comprises two mould halves, the mould halves having a moulding surface each and enclosing in the closed state of the mould a moulding cavity which defines the shape of the contact lens, having a dispensing device for feeding a polymerisable contact lens material into the one mould half, having a light source for exposing the contact lens material enclosed in the moulding cavity after closing the mould to light, whereby the material enclosed in the moulding cavity is polymerised and an as yet unhydrated contact lens is produced, wherein a device for corona discharge pre-treatment is provided which has an electrode with an annular facing and pre-treats the moulding surface of the one mould half in an annular region outside the optical zone of the contact lens in such a manner that, when the mould is opened, the contact lens adheres to the pre-treated mould half without causing adverse effect on the optical zone of the contact lens.

7. An apparatus according to claim 6, wherein the mould half to be treated is the male mould half, and the annular face of the electrode facing the moulding surface is concave.

8. An apparatus according to claim 6, which comprises a tempering oven for the still closed mould with the unhydrated contact lens adhering to the one mould half, and a hydration device for detaching and hydrating the as yet unhydrated contact lens.

9. An apparatus according to claim 7, which further comprises a device for dyeing which dyes the as yet unhydrated contact lens, adhering to the male mould half, in its iris region.

10. An apparatus according to claim 9, wherein the device for dyeing comprises a dyeing tampon which can be pressed onto the iris region of the contact lens in order to dye that region.

* * * * *